(12) United States Patent
Zhong et al.

(10) Patent No.: US 11,675,259 B2
(45) Date of Patent: Jun. 13, 2023

(54) LIGHT SOURCE SYSTEM AND CORRESPONDING PROJECTOR SYSTEM

(71) Applicant: CHENGDU XGIMI TECHNOLOGY CO LTD, Sichuan (CN)

(72) Inventors: Bo Zhong, Sichuan (CN); Shi Xiao, Sichuan (CN); Lei Yin, Sichuan (CN)

(73) Assignee: CHENGDU XGIMI TECHNOLOGY CO LTD, Chengdu (CN)

(*) Notice: Subject to any disclaimer, the term of this patent is extended or adjusted under 35 U.S.C. 154(b) by 62 days.

(21) Appl. No.: 17/600,136

(22) PCT Filed: Mar. 13, 2020

(86) PCT No.: PCT/CN2020/079151
§ 371 (c)(1),
(2) Date: Sep. 30, 2021

(87) PCT Pub. No.: WO2021/103345
PCT Pub. Date: Jun. 3, 2021

(65) Prior Publication Data
US 2022/0163877 A1 May 26, 2022

(30) Foreign Application Priority Data
Nov. 25, 2019 (CN) .......................... 201911171108.6

(51) Int. Cl.
G03B 21/20 (2006.01)
G02B 27/10 (2006.01)

(52) U.S. Cl.
CPC ....... *G03B 21/204* (2013.01); *G02B 27/1006* (2013.01); *G03B 21/2013* (2013.01); *G03B 21/2066* (2013.01)

(58) Field of Classification Search
CPC .............. G03B 21/204; G03B 21/2013; G03B 21/2066; G03B 33/08; G03B 21/16; G02B 27/1006; G02B 26/008
See application file for complete search history.

(56) References Cited

U.S. PATENT DOCUMENTS 9,467,667 B2 * 10/2016 Hu ........................ H04N 9/3111
2012/0033185 A1 * 2/2012 Chang .................. H04N 9/3164
353/31

(Continued)

FOREIGN PATENT DOCUMENTS

CN 101248389 A 8/2008
CN 204389864 U 5/2015

(Continued)

OTHER PUBLICATIONS

The International search report for PCT Application No. PCT/CN2020/079151, dated May 21, 2020, 8 pages.

(Continued)

Primary Examiner — Magda Cruz
(74) Attorney, Agent, or Firm — East IP P.C.

(57) ABSTRACT

A light source system, comprising a first light source, a first wavelength conversion device, a second wavelength conversion device, a light path conversion element, and a light combining unit. The light path conversion element is configured to make an excitation light emitted by the first light source irradiate the first wavelength conversion device and the second wavelength conversion device in turn, so as to correspondingly excite and generate a first excited light and a second excited light. The light combining unit is configured to combine the first excited light and the second excited light. A projector system, comprising the light source system.

6 Claims, 7 Drawing Sheets

(56) References Cited

U.S. PATENT DOCUMENTS

| | | | | |
|---|---|---|---|---|
| 2013/0010264 | A1* | 1/2013 | Takahashi | G03B 21/2013 353/31 |
| 2015/0226389 | A1* | 8/2015 | Kasugai | G02B 27/141 353/31 |
| 2015/0253654 | A1 | 9/2015 | Hu et al. | |
| 2017/0299953 | A1* | 10/2017 | Maeda | H04N 9/3161 |
| 2022/0197122 | A1* | 6/2022 | Zhong | G03B 21/208 |

FOREIGN PATENT DOCUMENTS

| | | | |
|---|---|---|---|
| CN | 105222047 A | | 1/2016 |
| CN | 205539893 U | | 8/2016 |
| CN | 205608228 U | | 9/2016 |
| CN | 105988268 A | | 10/2016 |
| CN | 107315311 A | | 11/2017 |
| CN | 207396956 U | | 5/2018 |
| CN | 108535944 A | | 9/2018 |
| CN | 109143744 A | | 1/2019 |
| CN | 109388003 A | | 2/2019 |
| CN | 109388003 A | * | 2/2019 ............. G03B 21/20 |
| CN | 110471245 A | | 11/2019 |
| CN | 110716380 A | | 1/2020 |
| JP | 2013101317 A | | 5/2013 |
| JP | 2015022249 A | | 2/2015 |
| JP | 2018525655 A | | 9/2018 |

OTHER PUBLICATIONS

The First Office Action for Chinese Application No. 201911171108. 6, dated Sep. 2, 2020, 18 pages.

The Second Office Action for Chinese Application No. 201911171108. 6, dated Nov. 13, 2020, 10 pages.

The Third Office Acton for Chinese Application No. 201911171108. 6, dated Feb. 1, 2021, 15 pages.

The First Office Action for Indian Application No. 202117041173, dated Sep. 6, 2022, 6 pages.

The First Office Action for Australian Application No. 2020390594, dated Sep. 12, 2022, 3 pages.

The First Office Action for Japan Application No. 2021-576767, dated Oct. 4, 2022, 13 pages.

* cited by examiner

LIGHT SOURCE SYSTEM AND CORRESPONDING PROJECTOR SYSTEM

CROSS-REFERENCE TO RELATED APPLICATION

This application is a National Stage of International Application No. PCT/CN2020/079151, filed on Mar. 13, 2020, which claims priority to Chinese Patent Application No. 201911171108.6, filed on Nov. 25, 2019, both of which are hereby incorporated by reference in their entireties.

TECHNICAL FIELD

This application relates to a field of projection technology, and in particular to a light source system and a corresponding projector system.

BACKGROUND

In a light source system of an existing projector, multiple light sources are correspondingly disposed for multiple wavelength conversion devices, so that one light source correspondingly excites one wavelength conversion device to generate an excited light. The economic efficiency of the light source system with this structure is poor.

SUMMARY

Embodiments of the present application provide a light source system and a corresponding projector system.

In a first aspect, an embodiment of the present application provides a light source system, including: a first light source, a first wavelength conversion device, a second wavelength conversion device, an light path conversion element, and a light combining unit;

the light path conversion element is configured to make an excitation light emitted by the first light source irradiate the first wavelength conversion device and the second wavelength conversion device in turn;

the excitation light emitted by the first light source irradiates the first wavelength conversion device, so as to excite and generate a first excited light;

the excitation light emitted by the first light source irradiates the second wavelength conversion device, so as to excite and generate a second excited light;

the light combining unit is configured to combine the first excited light with the second excited light.

In addition, the light source system provided by the embodiments of the present application further has the following additional technical features.

In some embodiments of the present application, the light path conversion element is a vibrating element that rotates back and forth around a base axis, and the vibrating element has a first working position and a second working position;

under a condition that the vibrating element is at the first working position, the excitation light emitted by the first light source irradiates the first wavelength conversion device after being reflected by the vibrating element;

under a condition that the vibrating element is at the second working position, the excitation light emitted by the first light source irradiates the second wavelength conversion device after being reflected by the vibrating element.

In some embodiments of the present application, the first wavelength conversion device is a transmission type wavelength conversion device or a reflection type wavelength conversion device;

the second wavelength conversion device is a transmission type wavelength conversion device or a reflection type wavelength conversion device.

The first wavelength conversion device and the second wavelength conversion device may be reflection type wavelength conversion devices or transmission type wavelength conversion devices. Under a condition that the first wavelength conversion device is the reflection type wavelength conversion device, the first excited light will be reflected by the first wavelength conversion device; under a condition that the first wavelength conversion device is the transmission type wavelength conversion device, the first excited light will pass through the first wavelength conversion device. Similarly, under a condition that the second wavelength conversion device is the reflection type wavelength conversion device, the second excited light will be reflected by the second wavelength conversion device; under a condition that the second wavelength conversion device is the transmission type wavelength conversion device, the second excited light will pass through the second wavelength conversion device.

In some embodiments of the present application, the light source system further includes a second light source;

the light combining unit is configured to combine the first excited light and the second excited light with an excitation light emitted by the second light source.

In the above technical solution, the second light source is configured to provide the excitation light, and the excitation light is combined with the first excited light and the second excited light.

In some embodiments of the present application, the light path conversion element is a rotating wheel that rotates around its own axis, and the rotating wheel has a first working position and a second working position;

the rotating wheel includes a first transmission area and a first reflection area arranged in a circumferential direction;

the first light source obliquely irradiates the rotating wheel;

under a condition that the rotating wheel is at the first working position, the excitation light emitted by the first light source irradiates the first wavelength conversion device after passing through the first transmission area;

under a condition that the rotating wheel is at the second working position, the excitation light emitted by the first light source irradiates the second wavelength conversion device after being reflected by the first reflection area.

In some embodiments of the present application, the light source system further includes a reflection element;

the rotating wheel further includes a second transmission area, and the first reflection area and the second transmission area are arranged along a radial direction of the rotating wheel;

under a condition that the rotating wheel is at the second working position, the excitation light emitted by the first light source irradiates the second wavelength conversion device after being reflected by the first reflection area, reflected by the reflection element, and passing through the second transmission area sequentially.

In some embodiments of the present application, the rotating wheel further has a third working position;

the rotating wheel further includes a second reflection area and a third reflection area, the first transmission area, the first reflection area, and the second reflection area are arranged along the circumferential direction of the rotating wheel, and the second reflection area and the third reflection area are distributed along the radial direction of the rotating wheel;

under a condition that the rotating wheel is at the third working position, the excitation light emitted by the first light source is combined with the first excited light and the second excited light after being reflected by the second reflection area, reflected by the reflection element, and reflected by the third reflection area sequentially.

In the above technical solution, the rotating wheel further includes a second reflection area and a third reflection area for reflection of the excitation light. Under a condition that the rotating wheel rotates to the third working position, the excitation light emitted by the first light source will be combined with the first excited light and the second excited light after being reflected by the second reflection area, reflected by the reflection element, and reflected by the third reflection area sequentially.

In some embodiments of the present application, the light source system further includes a reflection element;

the rotating wheel further includes a second reflection area, and the first reflection area and the second reflection area are arranged along a radial direction of the rotating wheel;

under a condition that the rotating wheel is at the second working position, the excitation light emitted by the first light source irradiates the second wavelength conversion device after being reflected by the first reflection area, reflected by the reflection element, and reflected by the second reflection area sequentially.

In the above technical solution, both the reflection element and the second reflection area of the rotating wheel can reflect the excitation light. Under a condition that the rotating wheel rotates to the second working position, the excitation light emitted by the first light source will irradiate the second wavelength conversion device after being reflected by the first reflection area, reflected by the reflection element, and reflected by the second reflection area sequentially.

In some embodiments of the present application, the rotating wheel further has a third working position;

the rotating wheel further includes a third reflection area and a second transmission area, the first transmission area, the first reflection area and the third reflection area are arranged along the circumferential direction of the rotating wheel, and the third reflection area and the second transmission area are distributed along the radial direction of the rotating wheel;

under a condition that the rotating wheel is at the third working position, the excitation light emitted by the first light source is combined with the first excited light and the second excited light after being reflected by the third reflection area, reflected by the reflection element, and passing through the second transmission area sequentially.

In the above technical solution, the rotating wheel further includes a third reflection area for reflection of the excitation light and a second transmission area for transmission of the excitation light. Under a condition that the rotating wheel rotates to the third working position, the excitation light emitted by the first light source will be combined with the first excited light and the second excited light after being reflected by the third reflection area, reflected by the reflection element, and passing through the second transmission area sequentially.

In some embodiments of the present application, the light combining unit includes a first light path turning system, a second light path turning system, a color filter wheel, and a light pipe;

the first excited light enters into the light pipe through the first light path turning system and the color filter wheel in sequence;

the second excited light enters into the light pipe through the second light path turning system and the color filter wheel in sequence.

In a second aspect, an embodiment of the present application provides a projector system, including the light source system provided in the first aspect.

BRIEF DESCRIPTION OF THE DRAWINGS

The drawings required to describe embodiments of the present application are introduced briefly below to illustrate technical solutions of the embodiments of the present application more clearly. It should be understood that the drawings described below only show some embodiments of the present application, and thus should not be regarded as a limitation of the scope. For those ordinary skilled in the art, other related drawings may be obtained from these drawings without any creative work.

Figure 1:
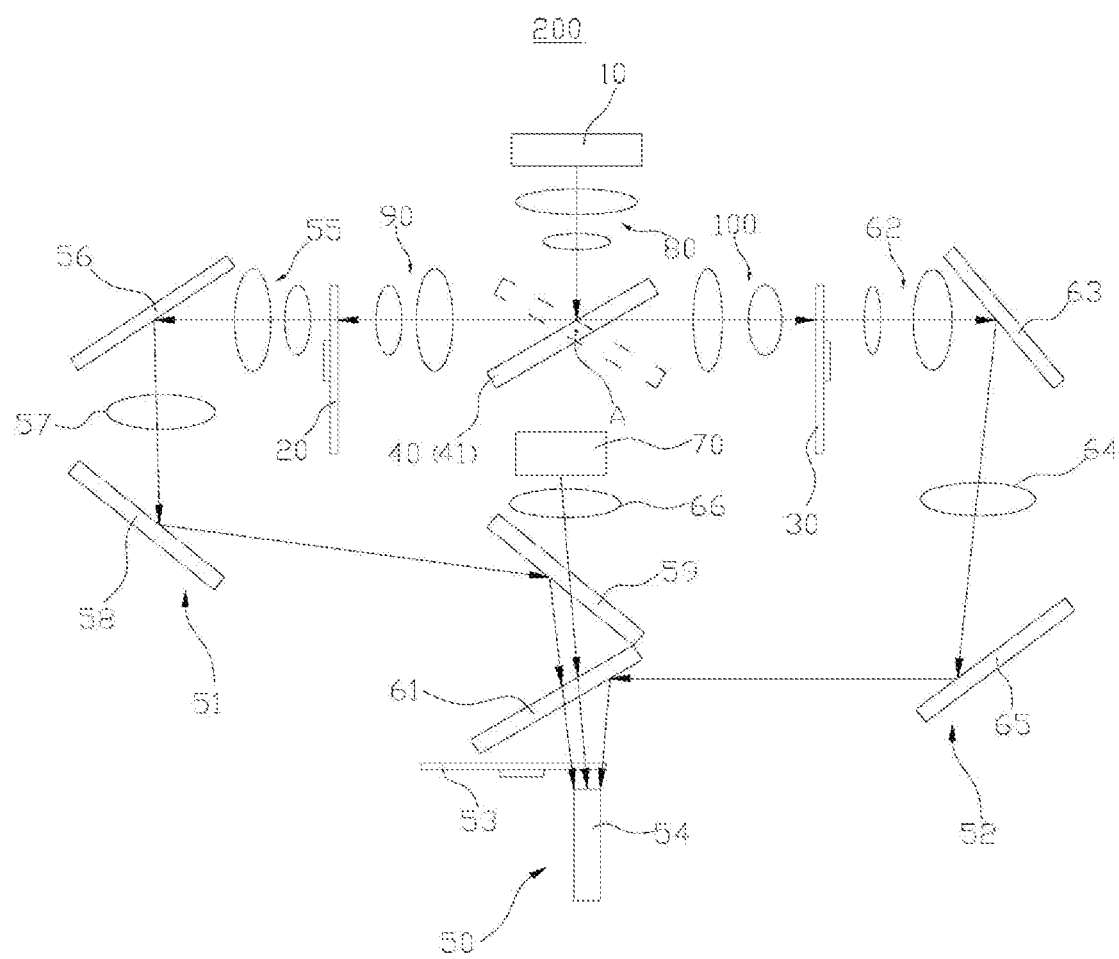
FIG. 1 is a schematic structural diagram of a light source system provided in Embodiment 1 of the present application.

Reference number: 200—light source system; 10—first light source; 20—first wavelength conversion device; 30—second wavelength conversion device; 40—light path conversion element; 41—vibrating element; 42—rotating wheel; 421—first transmission area; 422—first reflection area; 423—second transmission area; 424—second reflection area; 425—third reflection area; 50—light combining unit; 51—first light path turning system; 52—second light path turning system; 53—color filter wheel; 54—light pipe; 55—first shaping lens group; 56—first reflector; 57—second shaping lens group; 58—second reflector; 59—first beam splitter; 61—second beam splitter; 62—third shaping lens group; 63—third reflector; 64—fourth shaping lens group; 65—fourth reflector; 66—fifth shaping lens group; 70—second light source; 80—sixth shaping lens group; 90—seventh shaping lens group; 100—eighth shaping lens group; 110—reflection element; A-base axis.

DETAILED DESCRIPTION

In order to make the objects, technical solutions and advantages of the embodiments of the present application more clear, the technical solutions in the embodiments of the present application will be described clearly and completely in conjunction with the drawings in the embodiments of the present application. Obviously, the described embodiments are a part of the embodiments of the present application, but not all of the embodiments. The components of the embodiments of the present application generally described and shown in the drawings herein may be arranged and designed in various different configurations.

Therefore, the following detailed description of the embodiments of the present application provided in the drawings is not intended to limit the scope of the claimed application, but merely represents the selected embodiments of the present application. Based on the embodiments in the present application, all other embodiments obtained by those ordinary skilled in the art without any creative work shall fall within the protection scope of the present application.

It should be noted that the embodiments in the present application and the features in the embodiments could be combined with each other if there is no conflict.

It should be noted that similar reference numbers and letters indicate similar items in the following drawings. Therefore, once a certain item is defined in one drawing, it does not need to be further defined and explained in the subsequent drawings.

It should be noted that, in the description of the embodiments of the present application, the indicated orientation or positional relationship may be the orientation or positional relationship shown in the drawings, or may be the orientation or positional relationship of the product of the present application when the product is being used, or may be the orientation or positional relationship commonly understood by those ordinary skilled in the art. Further, the indicated orientation or positional relationship is only for the convenience of describing the present application and simplifying the description, and does not indicate or imply that the described device or element must have a specific orientation or must be constructed and operated in a specific orientation, and thus cannot be understood as a limitation of the present application. In addition, the terms "first", "second", "third" and the like are only used for distinguishing descriptions, and cannot be understood as indicating or implying relative importance.

Embodiment 1

As shown in FIG. 1, this embodiment provides a light source system 200, which includes a first light source 10, a first wavelength conversion device 20, a second wavelength conversion device 30, an light path conversion element 40 and a light combining unit 50.

The light path conversion element 40 is configured to make an excitation light emitted by the first light source 10 irradiate the first wavelength conversion device 20 and the second wavelength conversion device 30 in turn.

The excitation light emitted by the first light source 10 irradiates the first wavelength conversion device 20, so as to excite and generate a first excited light; and the excitation light emitted by the first light source 10 irradiates the second wavelength conversion device 30, so as to excite and generate a second excited light.

The light combining unit 50 is configured to combine the first excited light with the second excited light.

The light source system 200 makes the excitation light emitted by the first light source 10 irradiate the first wavelength conversion device 20 and the second wavelength conversion device 30 in turn through rotation of the light path conversion element 40. That is, the first wavelength conversion device 20 and the second wavelength conversion device 30 share the single first light source 10, which can effectively reduce the volume of the entire system and disperse the heat dissipation pressure of the system at the same time. Therefore, the structure may be used in high-power light source systems and may have low cost.

It should be noted that the first wavelength conversion device 20 and the second wavelength conversion device 30 may be rotating or stationary. Under a condition that the first wavelength conversion device 20 and the second wavelength conversion device 30 are rotating, the first wavelength conversion device 20 and the second wavelength conversion device 30 have a good heat dissipation performance, which increases their service life; under a condition that the first wavelength conversion device 20 and the second wavelength conversion device 30 are stationary, no noise is generated, so that the entire system has a good mute effect. Of course, under a condition that the first wavelength conversion device 20 and the second wavelength conversion device 30 are stationary, a heat dissipation device such as a radiator and a fan may be used for heat dissipation.

Exemplarily, the first wavelength conversion device 20 and the second wavelength conversion device 30 both are monochromatic phosphor wheels. In other embodiments, the first wavelength conversion device 20 and the second wavelength conversion device 30 may also have other structures, for example, they both are multicolored phosphor wheels. Of course, the first wavelength conversion device 20 and the second wavelength conversion device 30 may not be phosphor wheels, for example, they both are phosphor ceramics.

The function of the first light source 10 is to provide the excitation light. In this embodiment, the first light source 10 is a blue laser light source, and the excitation light emitted by the first light source 10 is a blue light. In other embodiments, the first light source 10 may also be a light source such as an ultraviolet light source, an LED light source and the like.

The color of the phosphors on the first wavelength conversion device 20 may be different from the color of the phosphors on the second wavelength conversion device 30. The color of the phosphors on the first wavelength conversion device 20 may be red, yellow, green and the like; the color of the phosphors on the second wavelength conversion device 30 may be red, yellow, green and the like. In this embodiment, the phosphors on the first wavelength conversion device 20 is green, and the phosphors on the second wavelength conversion device 30 is yellow. That is, the first excited light is a green light, and the second excited light is a yellow light.

The function of the light path conversion element 40 is to make the excitation light emitted by the first light source 10 irradiate the first wavelength conversion device 20 and the second wavelength conversion device 30 in turn, so as to correspondingly excite the first excited light and the second excited light.

Optionally, the light path conversion element 40 makes the excitation light emitted by the first light source 10 irradiate the first wavelength conversion device 20 and the second wavelength conversion device 30 in turn by rotating.

In this embodiment, the light path conversion element 40 is a vibrating element 41 that rotates back and forth around a base axis A, and the vibrating element 41 has a first working position and a second working position. Under a condition that the vibrating element 41 is at the first working position, the excitation light emitted by the first light source 10 irradiates the first wavelength conversion device 20 after being reflected by the vibrating element 41. Under a condition that the vibrating element 41 is at the second working position, the excitation light emitted by the first light source 10 irradiates the second wavelength conversion device 30 after being reflected by the vibrating element 41.

The vibrating element 41 can be vibrated to be located at the first working position and the second working position, so as to intermittently reflect the excitation light emitted by the first light source 10 to the first wavelength conversion device 20 and the second wavelength conversion device 30. The excitation light emitted by the first light source 10 does not always irradiate the same wavelength conversion device, thereby reducing the heat dissipation pressure of the first wavelength conversion device 20 and the second wavelength conversion device 30. The excitation light emitted by the first light source 10 is reflected to the first wavelength conversion device 20 and the second wavelength conversion device 30 through the vibration of the vibrating element 41, and the implementation is simple. Moreover, under a condition that the first wavelength conversion device 20 and the second wavelength conversion device 30 are rotating, the excitation light reflected by the vibrating element 41 during the vibration of the vibrating element 41 will irradiate the first wavelength conversion device 20 at different positions in the radial and circumferential directions and irradiate the second wavelength conversion device 30 at different positions in the radial and circumferential directions, thereby reducing the instantaneous temperature of the phosphors on the first wavelength conversion device 20 and the second wavelength conversion device 30.

The function of the vibrating element 41 is to reflect the excitation light, and the vibrating element 41 may be a reflector or a galvanometer coated with a reflection film. Of course, the reciprocating rotation of the vibrating element 41 may be realized by a driving device. For example, the vibrating element 41 is connected to an external motor, and the reciprocating rotation of the vibrating element 41 is realized through the forward and reverse rotation of the motor.

It should be noted that, the first working position of the vibrating element 41 may be a limit position of the vibrating element 41, or may be a non-limit position of the vibrating element 41; the second working position of the vibrating element 41 may be an limit position of the vibrating element 41, or may be a non-limit position of the vibration element 41. Under a condition that the first working position and the second working position are the limit positions of the vibrating element 41, the vibrating element 41 rotates clockwise around the base axis A and eventually reaches the first working position, and the vibrating element 41 rotates counterclockwise around the base axis A and eventually reaches the second working position. Under a condition that the first working position and the second working position are non-limit positions, when the vibrating element 41 rotates clockwise around the base axis A to the first working position, the vibrating element 41 can continue to rotate clockwise, and when the vibrating element 41 rotates counterclockwise around the base axis A to the second working position, the vibrating element 41 can continue to rotate counterclockwise.

The first wavelength conversion device 20 may be a transmission type wavelength conversion device or a reflection type wavelength conversion device; and the second wavelength conversion device 30 may be a transmission type wavelength conversion device or a reflection type wavelength conversion device.

In this embodiment, the first wavelength conversion device 20 and the second wavelength conversion device 30 both are transmission type wavelength conversion devices. That is, the first excited light excited after the excitation light irradiates the first wavelength conversion device 20 will pass through the first wavelength conversion device 20, and the second excited light excited after the excitation light irradiates the second wavelength conversion device 30 will pass through the second wavelength conversion device 30.

Further, the light combining unit 50 includes a first light path turning system 51, a second light path turning system 52, a color filter wheel 53 and a light pipe 54. The first excited light enters into the light pipe 54 through the first light path turning system 51 and the color filter wheel 53 in sequence; and the second excited light enters into the light pipe 54 through the second light path turning system 52 and the color filter wheel 53 in sequence.

The first light path turning system 51 and the second light path turning system 52 both play a role of changing the light path. Therefore, the first excited light excited by the first wavelength conversion device 20 and the second excited light excited by the second wavelength conversion device 30 are guided into the color filter wheel 53 and combined in the light pipe 54.

Exemplarily, the first light path turning system 51 includes a first shaping lens group 55, a first reflector 56, a second shaping lens group 57, a second reflector 58, a first beam splitter 59 and a second beam splitter 61. The first excited light passes through the first wavelength conversion device 20, and then enters into the light pipe 54 through the first shaping lens group 55, the first reflector 56, the second shaping lens group 57, the second reflector 58, the first beam splitter 59, the second beam splitter 61 and the color filter wheel 53 in sequence.

Here, the function of the first shaping lens group 55 is to shape the first excited light after passing through the first wavelength conversion device 20; the function of the second shaping lens group 57 is to shape the first excited light after being reflected by the first reflector 56; the function of the first beam splitter 59 is to reflect the first excited light after being reflected by the second reflector 58; and the function of the second beam splitter 61 is to reflect the first excited light after being reflected by the first beam splitter 59.

The second light path turning system 52 includes a third shaping lens group 62, a third reflector 63, a fourth shaping lens group 64 and a fourth reflector 65. The second excited light passes through the second wavelength conversion device 30, and then enters into the light pipe 54 through the third shaping lens group 62, the third reflector 63, the fourth shaping lens group 64, the fourth reflector 65, the second beam splitter 61 and the color filter wheel 53 in sequence.

Here, the function of the third shaping lens group 62 is to shape the second excited light after passing through the second wavelength conversion device 30; the function of the fourth shaping lens group 64 is to shape the second excited light after being reflected by the third reflector 63; and the function of the second beam splitter 61 is to reflect the second excited light after being reflected by the fourth reflector 65.

Optionally, the light source system 200 further includes a second light source 70. The light combining unit 50 is configured to combine the first excited light and the second excited light with an excitation light emitted by the second light source 70.

In this embodiment, the second light source 70 is a blue laser light source, and the excitation light emitted by the second light source 70 is a blue light.

The light combining unit 50 further includes a fifth shaping lens group 66. The excitation light emitted by the second light source 70 enters into the light pipe 54 through the fifth shaping lens group 66, the first beam splitter 59, the second beam splitter 61 and the color filter wheel 53 in sequence.

Here, the function of the fifth shaping lens group 66 is to shape the excitation light emitted by the second light source 70; the function of the first beam splitter 59 is to make the excitation light pass through after being shaped by the fifth shaping lens group 66; and the function of the second beam splitter 61 is to make the excitation light pass through after passing through the first beam splitter 59.

The color filter wheel 53 is the light path conversion element 40, and its function is to filter the light to obtain a bright color. The first excited light (green light) is filtered by the color filter wheel 53 to obtain an greener light; the second excited light (yellow light) is filtered by the color filter wheel 53 to obtain a red light; and the excitation light (blue light) emitted by the second light source 70 directly passes through the color filter wheel 53.

The first excited light excited by the first wavelength conversion device 20, the second excited light excited by the second wavelength conversion device 30, and the excitation light emitted by the second light source 70 will eventually enter into the light pipe 54, so as to obtain three primary colors of RGB. The function of the light pipe 54 is to homogenize the light beams.

In addition, in this embodiment, the light source system 200 further includes a sixth shaping lens group 80, a seventh shaping lens group 90, and an eighth shaping lens group 100.

The sixth shaping lens group 80 is disposed between the first light source 10 and the vibrating element 41. The excitation light emitted by the first light source 10 irradiates the vibrating element 41 after being shaped by the sixth shaping lens group 80.

The seventh shaping lens group 90 is disposed between the vibrating element 41 and the first wavelength conversion device 20. Under a condition that the vibrating element 41 is at the first working position, the excitation light reflected by the vibrating element 41 irradiates the first wavelength conversion device 20 after being shaped by the seventh shaping lens group 90.

The eighth shaping lens group 100 is disposed between the vibrating element 41 and the second wavelength conversion device 30. Under a condition that the vibrating element 41 is at the second working position, the excitation light reflected by the vibrating element 41 irradiates the second wavelength conversion device 30 after being shaped by the eighth shaping lens group 100.

It should be noted that the light path conversion element 40 may also make the excitation light emitted by the first light source 10 irradiate the first wavelength conversion device 20 and the second wavelength conversion device 30 in turn by other ways than rotating. For example, the light path conversion element 40 includes a first reflection element and a second reflection element. The first reflection element is a fixed element, and the second reflection element can move back and forth between a first position and a second position. Under a condition that the second reflection element is at the first position, the excitation light emitted by the first light source 10 is reflected by the first reflection element to the first wavelength conversion device 20. Under a condition that the second reflection element is at the second position, the excitation light emitted by the first light source 10 is sequentially reflected by the first reflection element and the second reflection element to the second wavelength conversion device 30.

Embodiment 2

Figure 2:
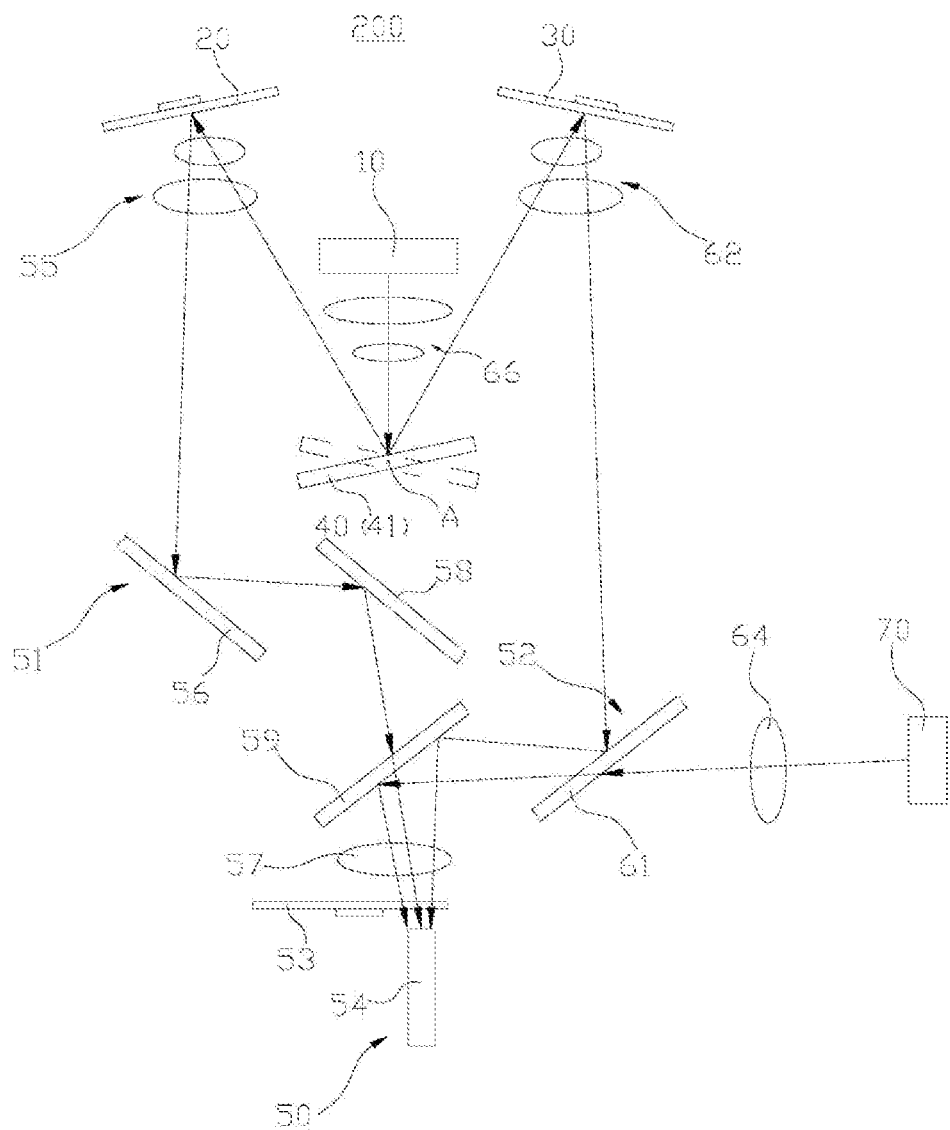
FIG. 2 is a schematic structural diagram of a light source system provided in Embodiment 2 of the present application.

As shown in FIG. 2, this embodiment provides a light source system 200. The differences between Embodiment 2 and Embodiment 1 described above are that the first wavelength conversion device 20 and the second wavelength conversion device 30 both are reflection type wavelength conversion devices, and the specific structures of the first light path turning system 51 and the second light path turning system 52 of the light combining unit 50 are different from those of Embodiment 1 described above.

The first wavelength conversion device 20 is the reflection type wavelength conversion device, that is, the first excited light excited after the excitation light irradiates the first wavelength conversion device 20 will be reflected by the first wavelength conversion device 20; the second wavelength conversion device 30 is the reflection type wavelength conversion device, that is, the second excited light excited after the excitation light irradiates the second wavelength conversion device 30 will be reflected by the second wavelength conversion device 30.

In this embodiment, the first light path turning system 51 includes a first shaping lens group 55, a first reflector 56, a second reflector 58, a first beam splitter 59, and a second shaping lens group 57. The first excited light is reflected by the first wavelength conversion device 20, and then enters into the light pipe 54 through the first shaping lens group 55, the first reflector 56, the second reflector 58, the first beam splitter 59, the second shaping lens group 57 and the color filter wheel 53 in sequence.

In this embodiment, under a condition that the vibrating element 41 is at the first working position, the excitation light reflected by the vibrating element 41 irradiates the first wavelength conversion device 20 after being shaped by the first shaping lens group 55. That is, the first shaping lens group 55 can not only shape the excitation light reflected by the vibrating element 41, but also shape the first excited light reflected by the first wavelength conversion device 20.

The first reflector 56 and the second reflector 58 play a role of reflecting the first excited light; the first beam splitter 59 plays a role of making the first excited light pass through; and the second shaping lens group 57 plays a role of shaping the first excited light after passing through the first beam splitter 59.

In this embodiment, the second light path turning system 52 includes a third shaping lens group 62 and a second beam splitter 61. The second excited light is reflected by the second wavelength conversion device 30, and then enters into the light pipe 54 through the third shaping lens group 62, the second beam splitter 61, the first beam splitter 59, the second shaping lens group 57 and the color filter wheel 53 in sequence.

In this embodiment, under a condition that the vibrating element 41 is at the second working position, the excitation light reflected by the vibrating element 41 irradiates the second wavelength conversion device 30 after being shaped by the second shaping lens group 57. That is, the second shaping lens group 57 can not only shape the excitation light reflected by the vibrating element 41, but also shape the second excited light reflected by the second wavelength conversion device 30.

The second beam splitter 61 plays a role of reflecting the second excited light; the first beam splitter 59 plays a role of reflecting the second excited light; and the second shaping lens plays a role of shaping the second excited light after being reflected by the first beam splitter 59.

In this embodiment, the light source system 200 further has a second light source 70. The light combining unit 50 is configured to combine the first excited light and the second excited light with an excitation light emitted by the second light source 70. Here, the second light source 70 is a blue laser light source, and the excitation light emitted by the second light source 70 is a blue light.

The light combining unit 50 further includes a fourth shaping lens group 64. The excitation light emitted by the second light source 70 enters into the light pipe 54 through the fourth shaping lens group 64, the second beam splitter 61, the first beam splitter 59, the second shaping lens group 57 and the color filter wheel 53 in sequence.

Here, the fourth shaping lens group 64 plays a role of shaping the excitation light emitted by the second light source 70; the second beam splitter 61 plays a role of making the excitation light pass through after being shaped by the fourth shaping lens group 64; the first beam splitter 59 plays a role of reflecting the excitation light after passing through the second beam splitter 59; and the second shaping lens group 57 plays a role of shaping the excitation light after being reflected by the first beam splitter 59.

In this embodiment, the light source system 200 further includes a fifth shaping lens group 66, and the fifth lens group is disposed between the first light source 10 and the vibrating element 41. The excitation light emitted by the first light source 10 irradiates the vibrating element 41 after being shaped by the fifth shaping lens group 66.

It should be noted that in this embodiment, the first wavelength conversion device 20 and the second wavelength conversion device 30 both are reflection type wavelength conversion devices; in Embodiment 1 described above, the first wavelength conversion device 20 and the second wavelength conversion device 30 both are transmission type wavelength conversion devices; in other embodiments, one of the first wavelength conversion device 20 and the second wavelength conversion device 30 may be a reflection type wavelength conversion device, and the other may be a transmission type wavelength conversion device.

Embodiment 3

Figure 3:
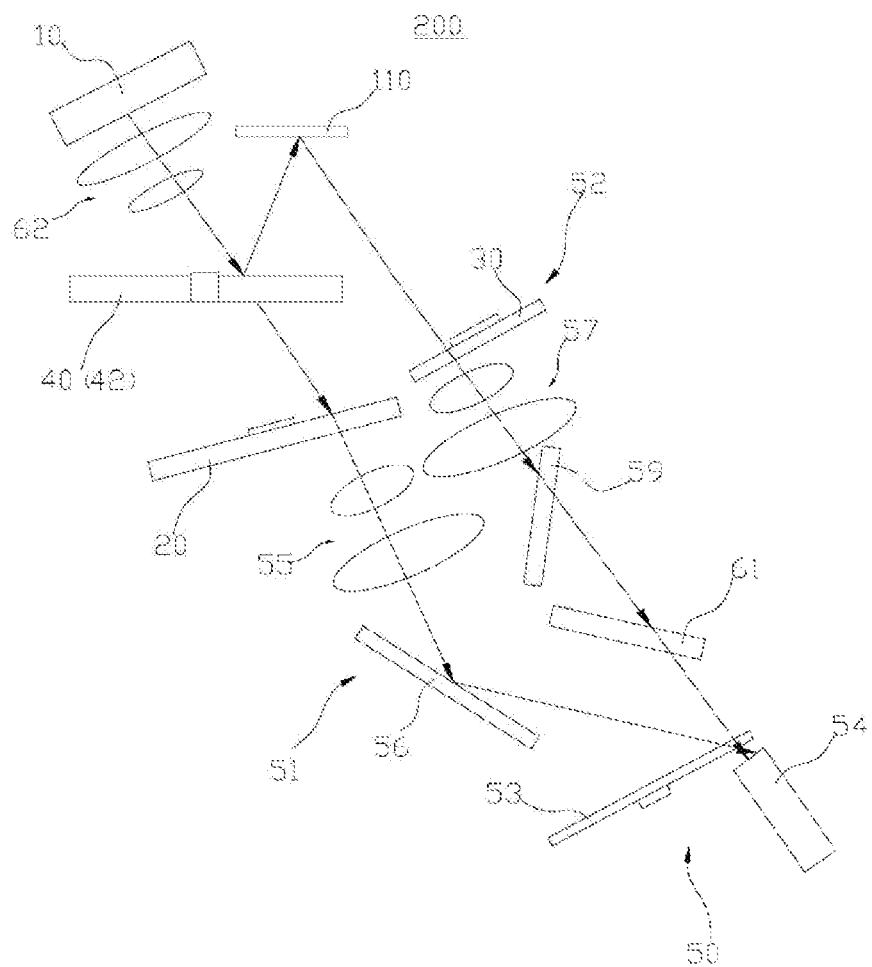
FIG. 3 is a schematic structural diagram of a light source system provided in Embodiment 3 of the present application.

As shown in FIG. 3, this embodiment provides a light source system 200. The differences between Embodiment 3 and Embodiment 1 described above are that the structure of the light path conversion element 40 is different, the specific structures of the first light path turning system 51 and the second light path turning system 52 of the light combining unit 50 are different, and there is only the first light source 10.

In this embodiment, the light path conversion element 40 is a rotating wheel 42 that rotates around its own axis, and the rotating wheel 42 has a first working position and a second working position.

Figure 4:
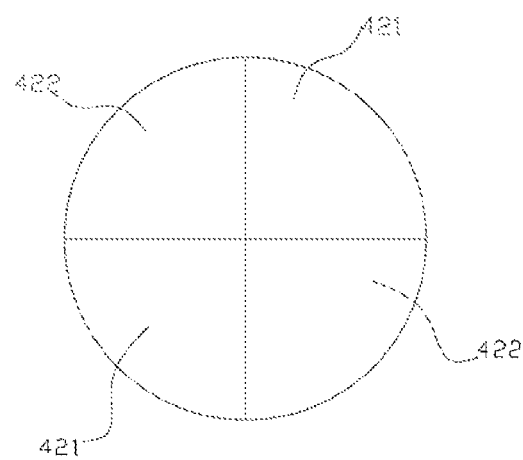
FIG. 4 is a schematic structural diagram of a rotating wheel shown in FIG. 3.

As shown in FIG. 4, the rotating wheel 42 includes a first transmission area 421 and a first reflection area 422 arranged in a circumferential direction. The first light source 10 obliquely irradiates the rotating wheel 42.

Continuing to refer to FIG. 3, under a condition that the rotating wheel 42 is at the first working position, the excitation light emitted by the first light source 10 irradiates the first wavelength conversion device 20 after passing through the first transmission area 421; under a condition that the rotating wheel 42 is at the second working position, the excitation light emitted by the first light source 10 irradiates the second wavelength conversion device 30 after being reflected by the first reflection area 422.

The light path conversion element 40 is the rotating wheel 42 that rotates around its own axis. The rotating wheel 42 can be rotated to the first working position and the second working position, so that the excitation light emitted by the first light source 10 intermittently irradiates the first transmission area 421 and the first reflection area 422. The excitation light emitted by the first light source 10 does not always irradiate the same wavelength conversion device, thereby reducing the heat dissipation pressure of the first wavelength conversion device and the second wavelength conversion device. Under a condition that the excitation light emitted by the first light source 10 irradiates the first transmission area, the excitation light will irradiate the first wavelength conversion device 20 after passing through the first transmission area 421; under a condition that the excitation light emitted by the first light source 10 irradiates the first reflection area, the excitation light will irradiate the second wavelength conversion device 30 after being reflected by the first reflection area 422.

In this embodiment, continuing to refer to FIG. 4, the first transmission area 421 and the first reflection area 422 of the rotating wheel 42 both are fan-shaped. The first transmission area 421 and the first reflection area 422 each has two areas, the two first transmission areas 421 are center-symmetric about the center axis of the rotating wheel 42, and the two first reflection regions 422 are center-symmetric about the center axis of the rotating wheel 42.

It should be noted that the excitation light emitted by the first light source 10 may directly irradiate the second wavelength conversion device 30 after being reflected by the first reflection region 422, or may indirectly irradiate the second wavelength conversion device 30 after being reflected by the first reflection region 422.

In this embodiment, the excitation light emitted by the first light source 10 may indirectly irradiate the second wavelength conversion device 30 after being reflected by the first reflection area 422, which will be described in detail below with reference to FIG. 3.

As shown in FIG. 3, the light source system 200 further includes a reflection element 110.

Under a condition that the rotating wheel 42 is at the second working position, the excitation light emitted by the first light source 10 irradiates the second wavelength conversion device 30 after being reflected by the first reflection area 422 and the reflection element 110 sequentially.

Here, the reflection element 110 may be a reflector.

In this embodiment, the light combining unit 50 includes a first light path turning system 51, a second light path turning system 52, a color filter wheel 53 and a light pipe 54. The first excited light enters into the light pipe 54 through the first light path turning system 51 and the color filter wheel 53 in sequence; and the second excited light enters into the light pipe 54 through the second light path turning system 52 and the color filter wheel 53 in sequence.

The first light path turning system 51 and the second light path turning system 52 both play a role of changing the light path. Therefore, the first excited light excited by the first wavelength conversion device 20 and the second excited light excited by the second wavelength conversion device 30 are guided into the color filter wheel 53 and combined in the light pipe 54.

In this embodiment, the first wavelength conversion device 20 and the second wavelength conversion device 30 both are transmission type wavelength conversion devices.

Exemplarily, the first light path turning system 51 includes a first shaping lens group 55 and a first reflector 56. The first excited light passes through the first wavelength conversion device 20, and then enters into the light pipe 54 through the first shaping lens group 55, the first reflector 56 and the color filter wheel 53 in sequence.

Here, the first shaping lens group 55 plays a role of shaping the first excited light after passing through the first wavelength conversion device 20; and the first reflector 56 plays a role of reflecting the first excited light after being shaped by the first shaping lens group 55.

The second light path turning system 52 includes a second shaping lens group 57, a first beam splitter 59 and a second beam splitter 61. The second excited light passes through the second wavelength conversion device 30, and then enters into the light pipe 54 through the second shaping lens group 57, the first beam splitter 59, the second beam splitter 61 and the color filter wheel 53 in sequence.

Here, the second shaping lens group 57 plays a role of shaping the second excited light after passing through the second wavelength conversion device 30; the first beam splitter 59 plays a role of making the second excited light pass through after being shaped by the second shaping lens group 57; and the second beam splitter 61 plays a role of making the second excited light pass through after passing through the first beam splitter 59.

In this embodiment, a third shaping lens group 62 is disposed between the first light source 10 and the rotating wheel 42. The excitation light emitted by the first light source 10 irradiates the rotating wheel 42 after being shaped by the third shaping lens group 62.

Embodiment 4

Figure 5:
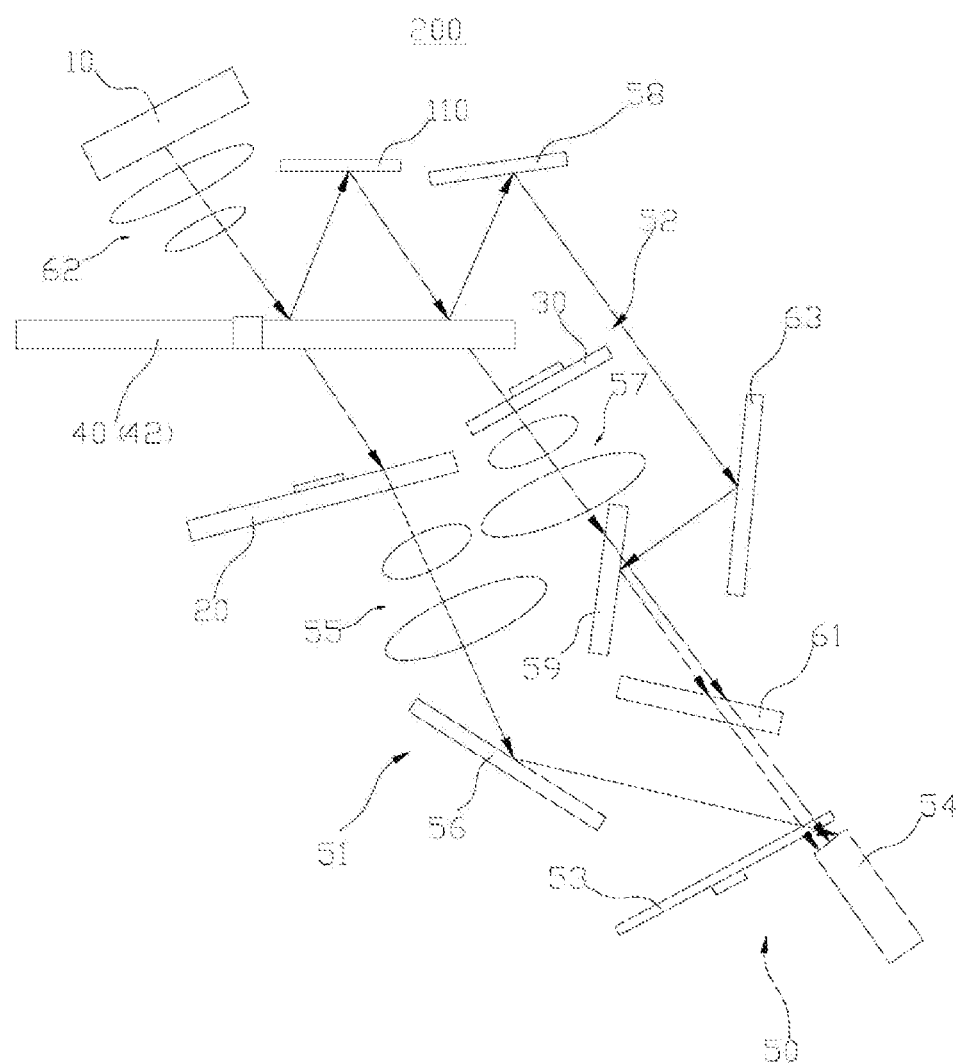
FIG. 5 is a schematic structural diagram of a light source system provided in Embodiment 4 of the present application.
Figure 6:
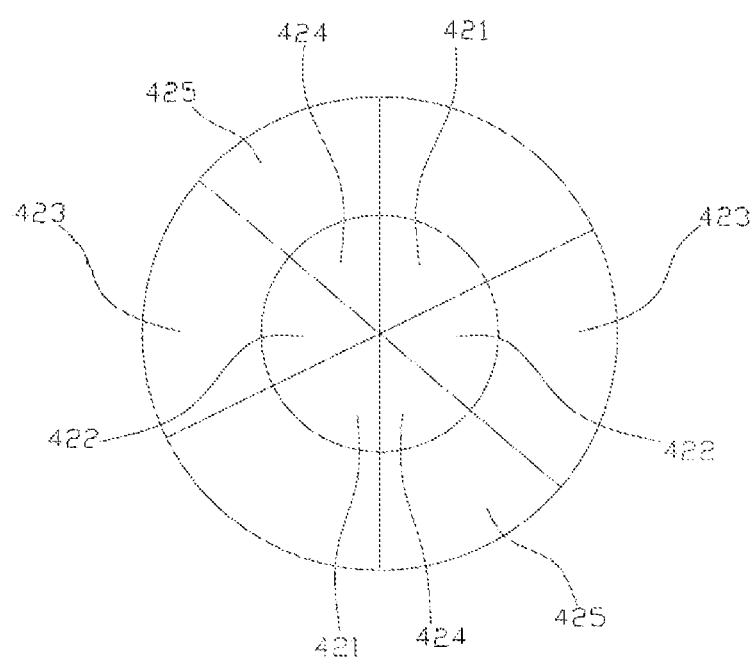
FIG. 6 is a schematic structural diagram of a rotating wheel shown in FIG. 5.

As shown in FIG. 5, this embodiment provides a light source system 200. The differences between Embodiment 4 and Embodiment 3 described above are that, as shown in FIG. 6, the rotating wheel 42 further includes a second transmission area 423, and the first reflection area 422 and the second transmission areas 423 are arranged along a radial direction of the rotating wheel 42.

As shown in FIG. 5, under a condition that the rotating wheel 42 is at the second working position, the excitation light emitted by the first light source 10 irradiates the second wavelength conversion device 30 after being reflected by the first reflection area 422, reflected by the reflection element 110, and passing through the second transmission area 423 sequentially.

The reflection element 110 can reflect the excitation light reflected by the first reflection area 422 to change the propagation path of the excitation light. This structure enables the first wavelength conversion device 20 and the second wavelength conversion device 30 to be located on the same side of the rotating wheel 42, which makes the structure of the entire light source system 200 more compact.

In this embodiment, the rotating wheel 42 further has a third working position, that is, the rotating wheel 42 can be rotated to the third working position. Continuing to refer to FIG. 6, the rotating wheel 42 further includes a second reflection area 424 and a third reflection area 425, the first transmission area 421, the first reflection area 422, and the second reflection area 424 are arranged along the circumferential direction of the rotating wheel 42, and the second reflection area 424 and the third reflection area 425 are distributed along the radial direction of the rotating wheel 42.

Continuing to refer to FIG. 5, under a condition that the rotating wheel 42 is at the third working position, the excitation light emitted by the first light source 10 is combined with the first excited light and the second excited light after being reflected by the second reflection area 424, reflected by the reflection element 110, and reflected by the third reflection area 425 sequentially. That is, the excitation light (blue light) emitted by the first light source 10, the first excited light (green light) and the second excited light (yellow light) are finally combined under the action of the light combining unit 50.

In this embodiment, the first transmission area 421, the second transmission area 423, the first reflection area 422, the second reflection area 424, and the third reflection area 425 are all fan-shaped. The first reflection area 422 is located at the inside of the second transmission area 423, and the second reflection area 424 is located at the inside of the third reflection area 425. There are two first transmission areas 421, and the two first transmission areas 421 are center-symmetric about the center axis of the rotating wheel 42. There are two second transmission areas 423, and the two second transmission areas 423 are center-symmetric about the center axis of the rotating wheel 42. There are two first reflection areas 422, and the two first reflection areas 422 are center-symmetric about the center axis of the rotating wheel 42. There are two second reflection areas 424, and the two second reflection areas 424 are center-symmetric about the center axis of the rotating wheel 42. There are two third reflection area 425, and the two third reflection areas 425 are center-symmetric about the center axis of the rotating wheel 42.

The structures of the first light path turning system 51 and the second light path turning system 52 of the light combining unit 50 are the same as those of Embodiment 3 described above, which will not be repeated here.

In this embodiment, the light combining unit 50 further includes a second reflector 58 and a third reflector 63. The excitation light is reflected by the third reflection area 425 of the rotating wheel 42, and then enters into the light pipe 54 through the second reflector 58, the third reflector 63, the first beam splitter 59, the second beam splitter 61 and the color filter wheel 53 in sequence.

Here, the second reflector 58 plays a role of reflecting the excitation light reflected by the third reflection area 425; the third reflector 63 plays a role of reflecting the excitation light reflected by the second reflector 58; the first beam splitter 59 plays a role of reflecting the excitation light reflected by the third reflector 63; and the second beam splitter 61 plays a role of making the excitation light reflected by the first beam splitter 59 pass through.

Embodiment 5

Figure 7:
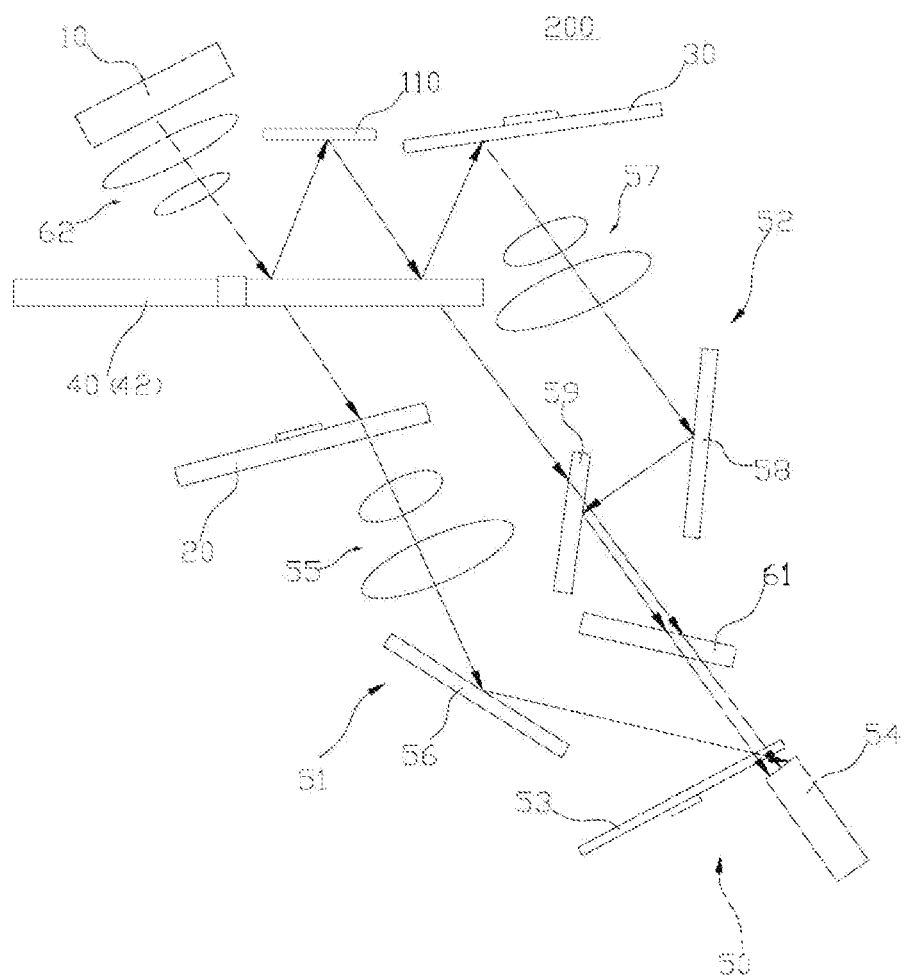
FIG. 7 is a schematic structural diagram of a light source system provided in Embodiment 5 of the present application.

As shown in FIG. 7, this embodiment provides a light source system 200. The differences between Embodiment 5 and Embodiment 3 described above are that the way in which the excitation light is reflected by the reflection element 110 to the second wavelength conversion device 30 is different.

Figure 8:
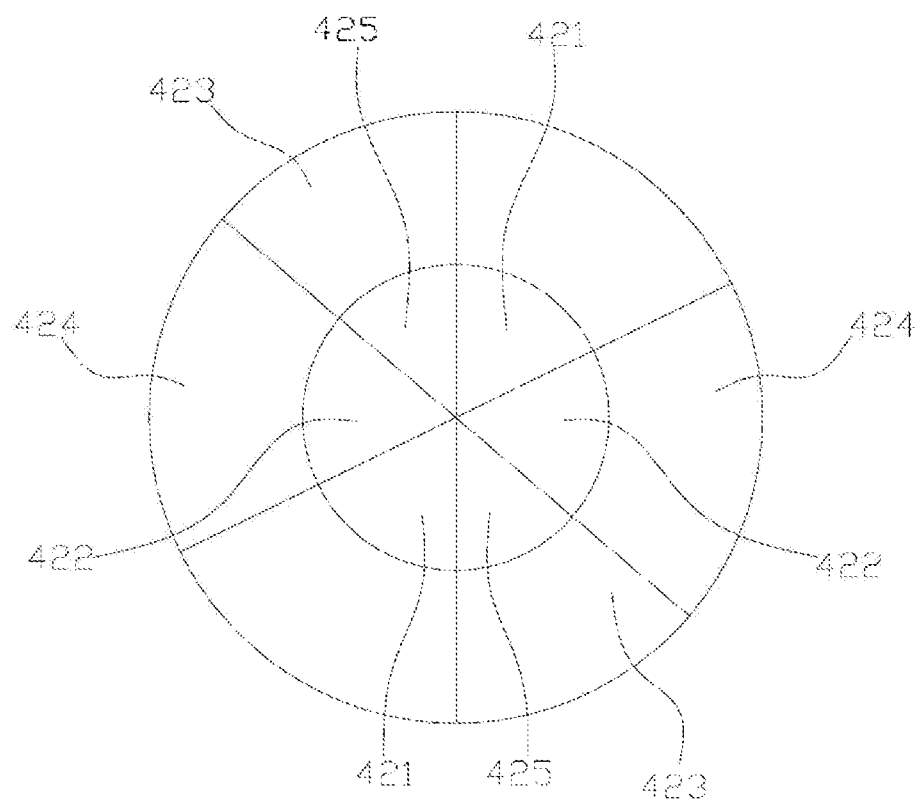
FIG. 8 is a schematic structural diagram of a rotating wheel shown in FIG. 7.

In this embodiment, as shown in FIG. 8, the rotating wheel 42 further includes a second reflection area 424, and the first reflection area 422 and the second reflection area 424 are arranged along the radial direction of the rotating wheel 42.

Continuing to refer to FIG. 7, under a condition that the rotating wheel 42 is at the second working position, the excitation light emitted by the first light source 10 irradiates the second wavelength conversion device 30 after being reflected by the first reflection area 422, reflected by the reflection element 110, and reflected by the second reflection area 424 sequentially.

In this embodiment, the second wavelength conversion device 30 is the reflection type wavelength conversion device.

Further, the rotating wheel 42 also has a third working position, that is, the rotating wheel 42 can be rotated to the third working position. Continuing to refer to FIG. 8, the rotating wheel 42 further includes a third reflection area 425 and a second transmission area 423. The first transmission area 421, the first reflection area 422 and the third reflection area 425 are arranged along the circumferential direction of the rotating wheel 42, and the third reflection area 425 and the second transmission area 423 are distributed along the radial direction of the rotating wheel 42.

Continuing to refer to FIG. 7, under a condition that the rotating wheel 42 is at the third working position, the excitation light emitted by the first light source 10 is combined with the first excited light and the second excited light after being reflected by the third reflection area 425, reflected by the reflection element 110, and passing through the second transmission area 423 sequentially.

In this embodiment, the first transmission area 421, the second transmission area 423, the first reflection area 422, the second reflection area 424, and the third reflection area 425 are all fan-shaped. The first reflection area 422 is located at the inside of the second reflection area 424, and the third reflection area 425 is located at the inside of the second transmission area 423. There are two first transmission areas 421, and the two first transmission areas 421 are center-symmetric about the center axis of the rotating wheel 42. There are two second transmission areas 423, and the two second transmission areas 423 are center-symmetric about the center axis of the rotating wheel 42. There are two first reflection areas 422, and the two first reflection areas 422 are center-symmetric about the center axis of the rotating wheel 42. There are two second reflection areas 424, and the two second reflection areas 424 are center-symmetric about the center axis of the rotating wheel 42. There two third reflection areas 425, and the two third reflection areas 425 are center-symmetric about the center axis of the rotating wheel 42.

The structure of the first light path turning system 51 of the light combining unit 50 is the same as that of Embodiment 3 described above, and its description not be repeated here.

The second light path turning system 52 includes a second shaping lens group 57, a second reflector 58, a first beam splitter 59 and a second beam splitter 61. The second excited light is reflected by the second wavelength conversion device 30, and then enters into the light pipe 54 through the second shaping lens group 57, the second reflector 58, the first beam splitter 59, the second beam splitter 61 and the color filter wheel 53 in sequence.

Here, the second shaping lens group 57 plays a role of shaping the second excited light after being reflected by the second wavelength conversion device 30; the second reflector 58 plays a role of reflecting the second excited light after being shaped by the second shaping lens group 57; the first beam splitter 59 plays a role of reflecting the second excited light after being reflected by the second reflector 58; and the second beam splitter 61 plays a role of making the second excited light pass through after being reflected by the first beam splitter 59.

In this embodiment, the excitation light passes through the second transmission area 423 of the rotating wheel 42, and then enters into the light pipe 54 through the first beam splitter 59, the second beam splitter 61 and the color filter wheel 53 in sequence.

Here, the first beam splitter 59 plays a role of making the excitation light pass through after passing through the second transmission area 423; and the second beam splitter 61 plays a role of making the excitation light pass through after passing through the first beam splitter 59.

Embodiment 6

This embodiment provides a projector system, including the light source system 200 in any of the above embodiments. Other structures in the projector system except for the light source system 200 can be referred to the related arts, which will not be repeated here.

The above embodiments are only preferred embodiments of the present application, and are not intended to limit the present application. For those skilled in the art, the present application can have various modifications and changes. Any modification, equivalent replacement and improvement made within the spirit and principle of the present application shall be included in the protection scope of the present application.

What is claimed is:

1. A light source system, characterized by comprising:
   a first light source;
   a first wavelength conversion device capable of being excited by an excitation light emitted by the first light source to generate a first excited light;
   a second wavelength conversion device capable of being excited by the excitation light emitted by the first light source to generate a second excited light;
   a light path conversion element configured to make the excitation light emitted by the first light source irradiate the first wavelength conversion device and the second wavelength conversion device in turn; and
   a light combining unit configured to combine the first excited light with the second excited light,
   wherein the light path conversion element is a rotating wheel that rotates around its own axis, and the rotating wheel has a first working position and a second working position;
   the rotating wheel comprises a first transmission area and a first reflection area arranged in a circumferential direction;
   the first light source obliquely irradiates the rotating wheel;
   under a condition that the rotating wheel is at the first working position, the excitation light emitted by the first light source irradiates the first wavelength conversion device after passing through the first transmission area;
   under a condition that the rotating wheel is at the second working position, the excitation light emitted by the first light source irradiates the second wavelength conversion device after being reflected by the first reflection area.

2. The light source system according to claim 1, wherein the light source system further comprises a reflection element;
   the rotating wheel further comprises a second transmission area, and the first reflection area and the second transmission area are arranged along a radial direction of the rotating wheel;
   under a condition that the rotating wheel is at the second working position, the excitation light emitted by the first light source irradiates the second wavelength conversion device after being reflected by the first reflection area, reflected by the reflection element, and passing through the second transmission area sequentially.

3. The light source system according to claim 2, wherein the rotating wheel further has a third working position;

the rotating wheel further comprises a second reflection area and a third reflection area, the first transmission area, the first reflection area, and the second reflection area are arranged along the circumferential direction of the rotating wheel, and the second reflection area and the third reflection area are distributed along the radial direction of the rotating wheel;

under a condition that the rotating wheel is at the third working position, the excitation light emitted by the first light source is combined with the first excited light and the second excited light after being reflected by the second reflection area, reflected by the reflection element, and reflected by the third reflection area sequentially.

4. The light source system according to claim 1, wherein the light source system further comprises a reflection element;

the rotating wheel further comprises a second reflection area, and the first reflection area and the second reflection area are arranged along a radial direction of the rotating wheel;

under a condition that the rotating wheel is at the second working position, the excitation light emitted by the first light source irradiates the second wavelength conversion device after being reflected by the first reflection area, reflected by the reflection element, and reflected by the second reflection area sequentially.

5. The light source system according to claim 4, wherein the rotating wheel further has a third working position;

the rotating wheel further comprises a third reflection area and a second transmission area, the first transmission area, the first reflection area and the third reflection area are arranged along the circumferential direction of the rotating wheel, and the third reflection area and the second transmission area are distributed along the radial direction of the rotating wheel;

under a condition that the rotating wheel is at the third working position, the excitation light emitted by the first light source is combined with the first excited light and the second excited light after being reflected by the third reflection area, reflected by the reflection element, and passing through the second transmission area sequentially.

6. A projector system, characterized by comprising the light source system according to claim 1.

* * * * *